March 11, 1941.  E. C. GOODRICH  2,234,403
PNEUMATIC TIRE BOOT OR LINER
Filed Jan. 2, 1940
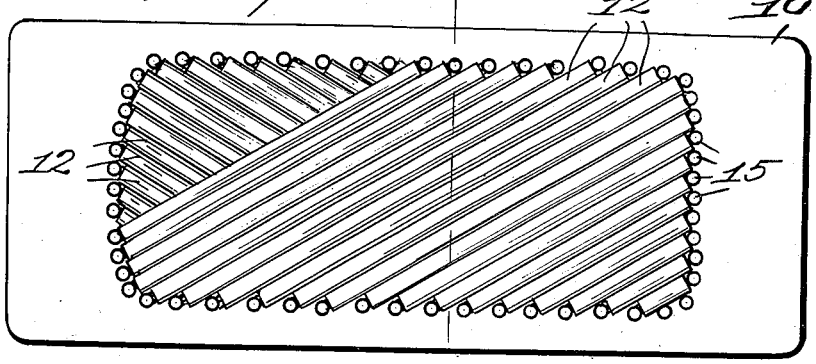
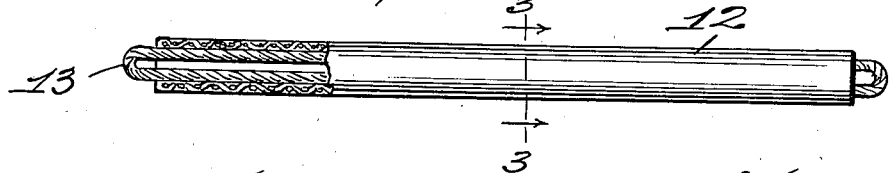
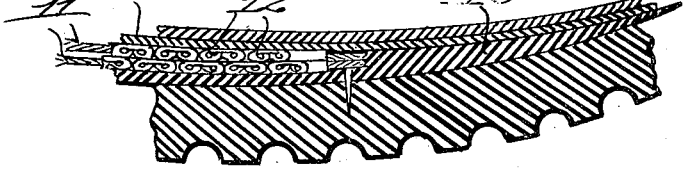
INVENTOR:—
EVERETT C. GOODRICH.
By Martin P. Smith ATTY.

Patented Mar. 11, 1941

2,234,403

UNITED STATES PATENT OFFICE 2,234,403

PNEUMATIC TIRE BOOT OR LINER

Everett C. Goodrich, Los Angeles, Calif.

Application January 2, 1940, Serial No. 312,021

2 Claims. (Cl. 152—204)

My invention relates generally to pneumatic tires and more particularly to a reinforcing and protective element in the nature of a boot or liner that is positioned between the casing and inner tube of the tire or which element may be in the form of a flexible reinforcement that is embedded in the tread portion of a tire casing.

The principal objects of my invention are, to construct a tire repair boot or liner of the character referred to that is composed of rubber to which is secured, by vulcanizing or otherwise, a number of reinforcing members, each comprising a section of small wire rope or cable that is embedded in a doubled strip of flexible material, such as cord fabric that is utilized for the reinforcement of tire casings, and to construct the reinforcing members of the boot or liner so that portions of the wire cables project slightly beyond the ends of the enclosing cord fabric in order to permit tacks or the like to be inserted through the projecting ends of the cables, thereby providing a plurality of prongs that are adapted to enter the body of the tire casing when the boot or liner is applied thereto and consequently firmly anchoring the boot or liner to said casing and preventing creeping of the boot or liner while the tire to which it is applied is in service.

A further object of my invention is, to provide a repair boot or liner where there are at least two sets of the reinforcing members composed of wire cables embedded in cord fabric, with one set overlying the other and arranged so that the members of the two sets are disposed at angles with respect to each other, thus producing a reinforcing boot or liner having great strength and resistance to internal strains tending to produce blow-outs and also providing a highly effective shield against punctures of the tire as a result of contact and engagement with nails, tacks, thorns, broken glass, and the like.

With the foregoing and other objects in view, my invention consists in certain novel features of construction and arrangement of parts that will be hereinafter more fully described and claimed and illustrated in the accompanying drawing in which:

Fig. 1 is a plan view looking against the inside of a tire repair boot constructed in accordance with my invention and with a number of the reinforcing members of the upper layer removed.

Fig. 2 is a plan view of one of the reinforcing members with a portion thereof in horizontal section.

Fig. 3 is an enlarged cross section taken on the line 3—3 of Fig. 2.

Fig. 4 is a section taken on a circumferential plane through the center of a portion of a pneumatic tire and showing a portion of the boot positioned between the casing and inner tube.

Fig. 5 is an enlarged cross section taken on the line 5—5 of Fig. 1.

Referring by numerals to the accompanying drawing which illustrates a preferred embodiment of my invention, 10 designates the main body of the boot which may be made in various sizes so as to be readily combined with tire casings and tubes of different sizes and this body is preferably composed of rubber or composition having rubber as its principal ingredient and the thickness of said body gradually decreases toward its edges in order that it may fit snugly between the inner surface of a tire casing and the inner tube without producing abrupt shoulders along the edges of the shoe.

If desired the body 10 of the shoe may include one or more embedded layers of fabric or like flexible material.

Where the boot is produced for use in repairing blow-outs, breaks or weak spots in casings, said boot may have a length of from six to twelve or fifteen inches and where it is constructed for use as a reinforcing liner it is ring-shaped in order to extend entirely around the inner tube and casing with which it is associated.

Embedded in the upper portion of the body 10 or below that face of the body that contacts the inner tube are two or more layers of reinforcing members, with the members forming each layer lying parallel with each other and disposed at an angle relative to the members of the other layer. In Fig. 1 I have shown the members of the two layers arranged approximately sixty degrees apart, but this angularity may be varied as desired. Each reinforcing member comprises a single length of wire rope or cable 11 that is doubled to form a narrow elongated loop and the ends of the wire rope or cable are secured to each other, preferably by solder.

The main body portions of the elongated loop of wire cable are embedded in a sheath or covering 12 of flexible material, preferably cord fabric such as is generally used in reinforcing tire casings and the sheath or enclosing member 12 is secured to the wire rope or cable, preferably by means of a suitable adhesive. The enclosing sheath 12 is slightly shorter than the doubled cable 11 and thus short portions 13 project from the ends of the sheath to form eyes for the reception of tacks or short pointed nails 14 which, when the boot is applied to the inner surface of the casing, are forced into the body of said casing as illustrated in Fig. 4 after the manner of the conventional "Cactus" repair boot heretofore produced and now on the market.

Obviously, the engagement of the pointed ends of the tacks or nails in the body of the casing very securely anchors the repair boot to the casing and prevents any creeping of the boot longitudinally of the casing and inner tube while the tire is in service.

The two layers of reinforcing members are permanently secured to each other and to the body 10 of the boot in any suitable manner, for instance by the vulcanizing process or by the use of cushion gum or a suitable adhesive such as rubber cement and the two layers of reinforcing members are preferably embedded in the body 10 to such an extent as that the upper faces of the upper layer of members lie practically flush with the upper or inner surface of the body 10.

Where the device is constructed for use as a repair boot or as a liner, a layer 15 of rubber or rubberized fabric is positioned between the boot or liner and the inner tube, thus effectually preventing the latter from making direct contact with the reinforcing members carried by the body of the boot or liner and the heads of the tacks or nails that pass through the eyes at the ends of the reinforcing members (see Fig. 4).

Where the device is constructed for use as a reinforcement for a tire casing, said device is embedded in the tread portion of the casing during the manufacture thereof.

In some instances it may be found desirable and practicable to secure or anchor the boot or liner to the inner surface of the casing by means of a suitable adhesive, preferably rubber cement, and where such practice is employed the use of the tacks or nails at the ends of the reinforcing members may be eliminated.

Thus it will be seen that I have provided a pneumatic repair and reinforcing member that is relatively simple in construction, inexpensive of manufacture and very effective in performing the functions for which it is intended.

It will be understood that minor changes in the size, form and construction of the various parts of my improved pneumatic tire boot or liner, may be made and substituted for those herein shown and described, without departing from the spirit of my invention, the scope of which is set forth in the appended claims.

I claim as my invention:

1. In a pneumatic tire boot or liner, a flexible member and a layer of reinforcing members embedded in said flexible member, each reinforcing member comprising a doubled section of wire cable and a sheath of flexible material enclosing same with the doubled ends of the wire cables projecting beyond the ends of the enclosing sheaths.

2. A pneumatic tire boot or liner comprising a flexible member, a plurality of layers of reinforcing members embedded in and secured to said flexible member, each layer of reinforcing members comprising a series of doubled wire cables, a sheath of flexible material enclosing each doubled wire cable with the doubled ends of the wire cables projecting beyond the ends of the sheaths and the members forming one layer of sheathed wire cables being disposed at angles relative to the members of the other layer.

EVERETT C. GOODRICH.